US008270128B2

(12) United States Patent
Munakata et al.

(10) Patent No.: US 8,270,128 B2
(45) Date of Patent: Sep. 18, 2012

(54) COMMUTATION TYPE DC BREAKER

(75) Inventors: Noriaki Munakata, Hitachi (JP); Masato Suzuki, Hitachi (JP); Yoshihiko Matsuda, Hitachiota (JP); Naoki Kawamura, Hitachinaka (JP); Manaba Takamoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/706,983

(22) Filed: Feb. 17, 2010

(65) Prior Publication Data

US 2010/0208392 A1 Aug. 19, 2010

(30) Foreign Application Priority Data

Feb. 19, 2009 (JP) ................................ 2009-036637

(51) Int. Cl.
*H02H 3/00* (2006.01)
*H02H 7/00* (2006.01)

(52) U.S. Cl. .......................................................... 361/4

(58) Field of Classification Search ................. 361/93.1, 361/4

See application file for complete search history.

(56) References Cited

U.S. PATENT DOCUMENTS

| | | | | |
|---|---|---|---|---|
| 5,402,297 | A * | 3/1995 | Ouchi et al. | 361/4 |
| 2003/0200648 | A1* | 10/2003 | Greer | 29/622 |

FOREIGN PATENT DOCUMENTS

| | | |
|---|---|---|
| EP | 1 939 909 | 7/2008 |
| JP | 5-234472 | 9/1992 |
| JP | 2000-048686 | 2/2000 |
| JP | 2000-48686 | 2/2000 |
| JP | 2000-048687 | 2/2000 |
| JP | 2001-143581 | 5/2001 |
| JP | 2003-259512 | 9/2003 |
| JP | 2008-220160 | 9/2008 |

OTHER PUBLICATIONS

JP 10-178710, Kikuchi Yukinori; Publication Date:Jun. 30, 1998, Abstract, Specification, Drawings 1-9.*

Extended European Search Report in European Patent Application No. 09015567.2-2214 mailed Jun. 7, 2010.

Notification of Reasons for Refusal in Japanese Application No. 2009-036637 mailed May 10, 2011 (with English translation).

* cited by examiner

*Primary Examiner* — Dharti Patel

(74) *Attorney, Agent, or Firm* — Brundidge & Stanger, P.C.

(57) ABSTRACT

A commutation type DC breaker comprising a main switch inserted in series into a main circuit for connecting a DC source and a load, a commutation capacitor, a reactor, and a commutation switch for supplying charges stored in the commutation capacitor to the main switch in an opposite direction to a main circuit current, producing a current zero point, thereby breaking the main switch, characterized in that the commutation capacitor, the reactor, and the commutation switch which are composed a commutation circuit and a control circuit for controlling the turning on or off of the main switch and the commutation switch are loaded on a frame with the main switch loaded.

2 Claims, 4 Drawing Sheets

COMMUTATION TYPE DC BREAKER

CLAIM OF PRIORITY

The present application claims priority from Japanese patent application serial No. 2009-036637, filed on Feb. 19, 2009, the content of which is hereby incorporated by reference into this application.

BACKGROUND OF THE INVENTION

1. Field of Technology

The present invention relates to a commutation type DC breaker and more particularly to a structure of a commutation type DC breaker for supplying charges stored in a commutation capacitor to a main switch in an opposite direction to a main circuit current, producing a current zero point, thereby breaking the main switch.

2. Description of Related Art

FIG. 3 is a drawing for explaining the breaking principle of the commutation type DC breaker. As shown in FIG. 3, a commutation type DC breaker 18 or 19 is connected between a direct current source 60 and a load 70 and includes a main switch 3 with the main circuit current supplied, a supersaturation reactor 10, a commutation circuit composed of a commutation capacitor 8 and a commutation switch 2, a charging power source, not drawn, for the commutation capacitor, and a control unit for controlling the aforementioned units. Further, the commutation type DC breaker 19 is connected to an external circuit, the commutation capacitor, and the supersatuation reactor via contactors 14A, 14B, and 14C.

When an excessive current is supplied to the main circuit 17A, the commutation type DC breaker 19 releases the main switch 3 and simultaneously turns on the commutation switch 2. At this time, the charges stored in the commutation capacitor 8 are discharged via the main switch 3 and a high frequency discharge current (a commutation current) accompanying discharge of the capacitor is supplied to the main switch 3. If the commutation current is superimposed on the main circuit current in this way, a current zero point is generated in the main circuit current and then the main circuit current is cut off (refer to Patent Documents 1 and 2).

FIG. 4 is a cross sectional view showing an example of the conventional commutation type DC breaker 19 arranged in a power board. In FIG. 4, a numeral 40 indicates a power board and it includes a front storage box 40A, a DC breaker storage box 41, and a back storage box 42A. In the front storage box 40A, a power board control unit 30A, terminal boards 20A, 20B and 20C, and a front door 31 are arranged. In the DC breaker storage box 41, the commutation type DC breaker 19 is arranged.

The commutation type DC breaker 19 includes the main switch 3, a main switch drive unit 1 for driving the main switch, main switch control circuits 4 to 7 for controlling the main switch drive unit, the commutation switch 2, the commutation capacitor 8, the supersaturation reactor, and a non-linear resistor 9 which are units necessary for commutation, and these units are arranged in the DC breaker storage box 41. On the back of the main switch 3, a main circuit conductor 17 is arranged. The main circuit conductor 17 is connected to a bus 13 via the main switch 3. A numeral 11 indicates an overcurrent detector mounted on the main circuit conductor. In the back storage box 42A, a cable 44 connected to an external load (a feeder) is stored. The cable is connected to the main circuit conductor 17 via a connecting conductor 21. Further, on the cable connecting conductor 21, a meter DC transformer 26, a DC transformer 23A, and a feeder failure selection unit 22 are mounted.

As shown in FIG. 4, the conventional commutation type DC breaker 19 includes the main switch 3, commutation switch 2, commutation capacitor 8, supersaturation reactor 10, and non-linear resistor 9 and for example, the commutation capacitor 8 and non-linear resistor 9 are arranged in the power board 40 in the vicinity of the main switch 3.

Patent Document 1: Japanese Patent Laid-open No. 2000-48686

Patent Document 2: Japanese Patent Laid-open No. 2001-143581

SUMMARY OF THE INVENTION

In the commutation type DC breaker, as mentioned above, the breaking method generates a zero point in the main circuit current by the commutation current from the capacitor, thereby breaking the main switch, so that the number of units composing the commutation type DC breaker is larger than that of an ordinary AC breaker and these units are arranged in the power board storing the main unit of the commutation type DC breaker.

Therefore, the arrangement of the units must be designed as a whole of the power board in consideration of connection with the main unit of the commutation type DC breaker (the main switch) and the design and manufacture of the power board having the built-in commutation type DC breaker requires much labor and time and causes higher costs.

The present invention was developed with the foregoing problems in view and integrally structures the main unit of the commutation type DC breaker (the main switch) and the units necessary for commutation, thereby lightening the burden imposed on the design and manufacture of the DC circuit power board having the built-in commutation type DC breaker. The present invention adopts the following means to solve the above problems.

In a commutation type DC breaker having a main switch inserted in series into a main circuit for connecting a DC source and a load, a commutation capacitor, a reactor, and a commutation switch for supplying charges stored in the commutation capacitor to the main switch in an opposite direction to a main circuit current, producing a current zero point, thereby breaking the main switch, characterized in that the commutation capacitor, the reactor, and the commutation switch which are composed a commutation circuit and a control circuit for controlling the turning on or off of the main switch and the commutation switch are loaded on a frame with the main switch loaded.

The present invention has the aforementioned structure, so that the burden imposed on the design and manufacture of the DC circuit power board having the built-in commutation type DC breaker can be lightened.

DETAILED DESCRIPTION OF THE PREFERRED EMBODIMENTS

Figure 1:
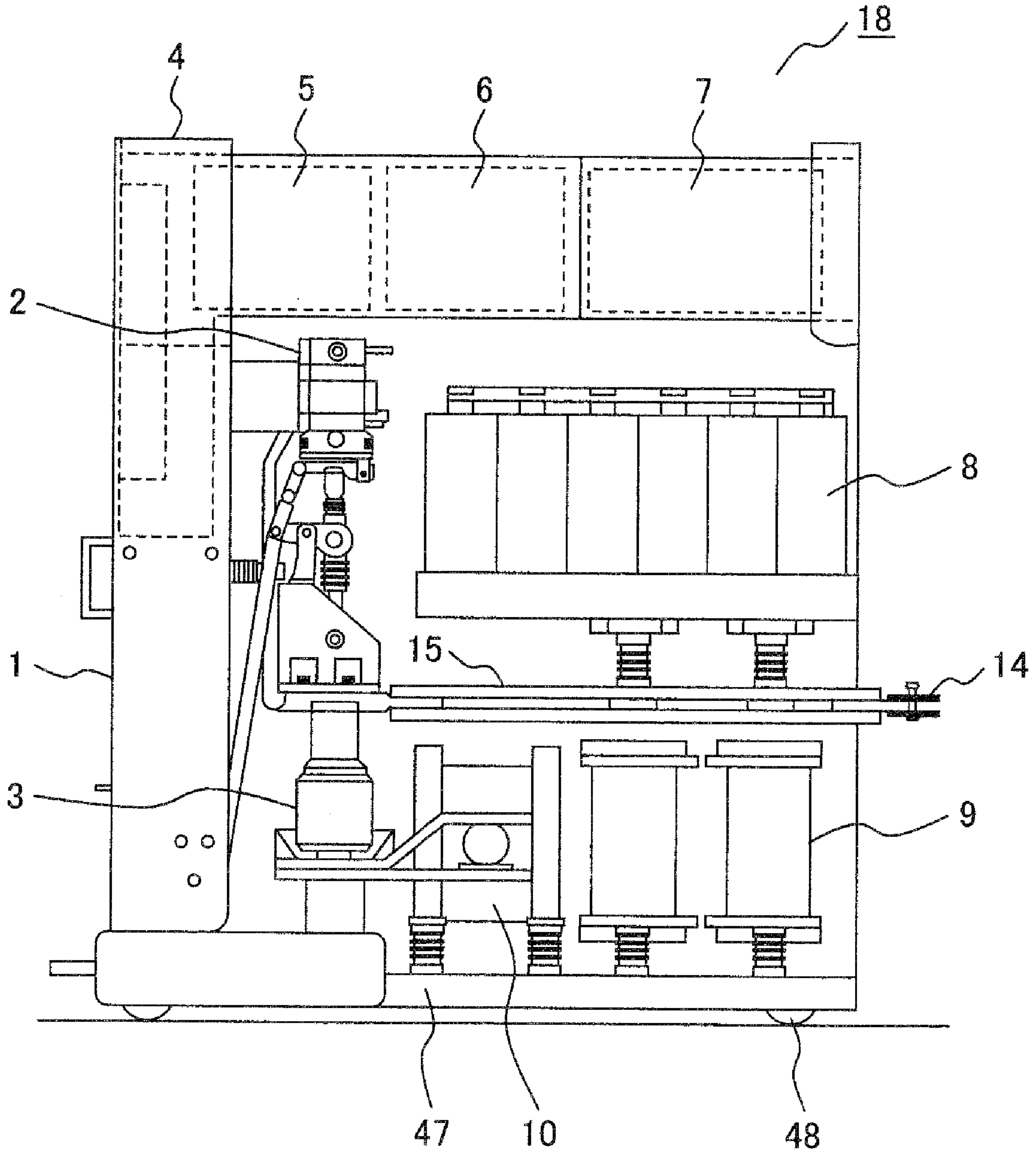
FIG. 1 is a drawing for explaining the commutation type DC breaker relating to an embodiment of the present invention.

Hereinafter, the preferred embodiment of the present invention will be explained with reference to the accompanying drawings. FIG. 1 is a drawing for explaining the commutation type DC breaker relating to an embodiment of the present invention. As shown in FIG. 1, a commutation type DC breaker 18 provides with the main switch 3, the main switch drive unit 1 for driving the main switch, the main switch control circuits 4 to 7 for controlling the main switch drive unit 1, and the commutation switch 2, commutation capacitor 8, supersaturation reactor 10, and non-linear resistor 9 which are units necessary for commutation, and these units are loaded on the frame 47.

Here, the main switch control units 4 to 7 are arranged on the upper part of the main switch drive unit 1 and the commutation capacitor 8 is arranged behind the commutation switch 2 (on the back side of the frame for loading the commutation type DC breaker 18). Further, the supersaturation reactor 10 and non-linear resistor 9 are arranged behind the main switch 3.

Behind the frame 47, a contactor 14 connected with the main circuit conductor 17 arranged in the DC breaker storage box 40 is arranged and the contactor 14 is connected to the main switch 3 via a link conductor 15 arranged between the commutation capacitor 8 and the non-linear resistor 9.

The commutation capacitor 8 loads a plurality of capacitors into which the capacity necessary to generate a zero point in the current flowing through the main switch 3 is divided. The other units composing the commutation type DC breaker 18, for example, the non-linear resistor 9 and supersaturation reactor 10 can be divided and loaded into a plurality of parts. Further, when dividing and loading the units, so as to ensure the insulation performance, the units are arranged with a predetermined air spatial distance kept, thus the overall commutation type DC breaker can be miniaturized.

As mentioned above, the main switch 3 composing the commutation type DC breaker 18, the main switch drive unit 1 for driving the main switch 3, the main switch control circuits 4 to 7 for controlling the main switch drive unit 1, and the commutation switch 2, commutation capacitor 8, supersaturation reactor 10, and non-linear resistor 9, which are units necessary for commutation, and these are loaded on the frame 47. The frame 47 is provided with wheels 48 supported movably, so that the commutation type DC breaker 18 loaded on the frame 47 can be wholly transferred in or out from the power board 40. Thus the commutation type DC breaker 18 can be handled as a DC breaker movable by hand.

Therefore, in manufacturing of the products, a reduction in the part manufacturing costs and improvements in operation efficiency due to mass production can be realized. Further, a verification test can be conducted by a single DC breaker and products can be stably supplied.

Figure 2:
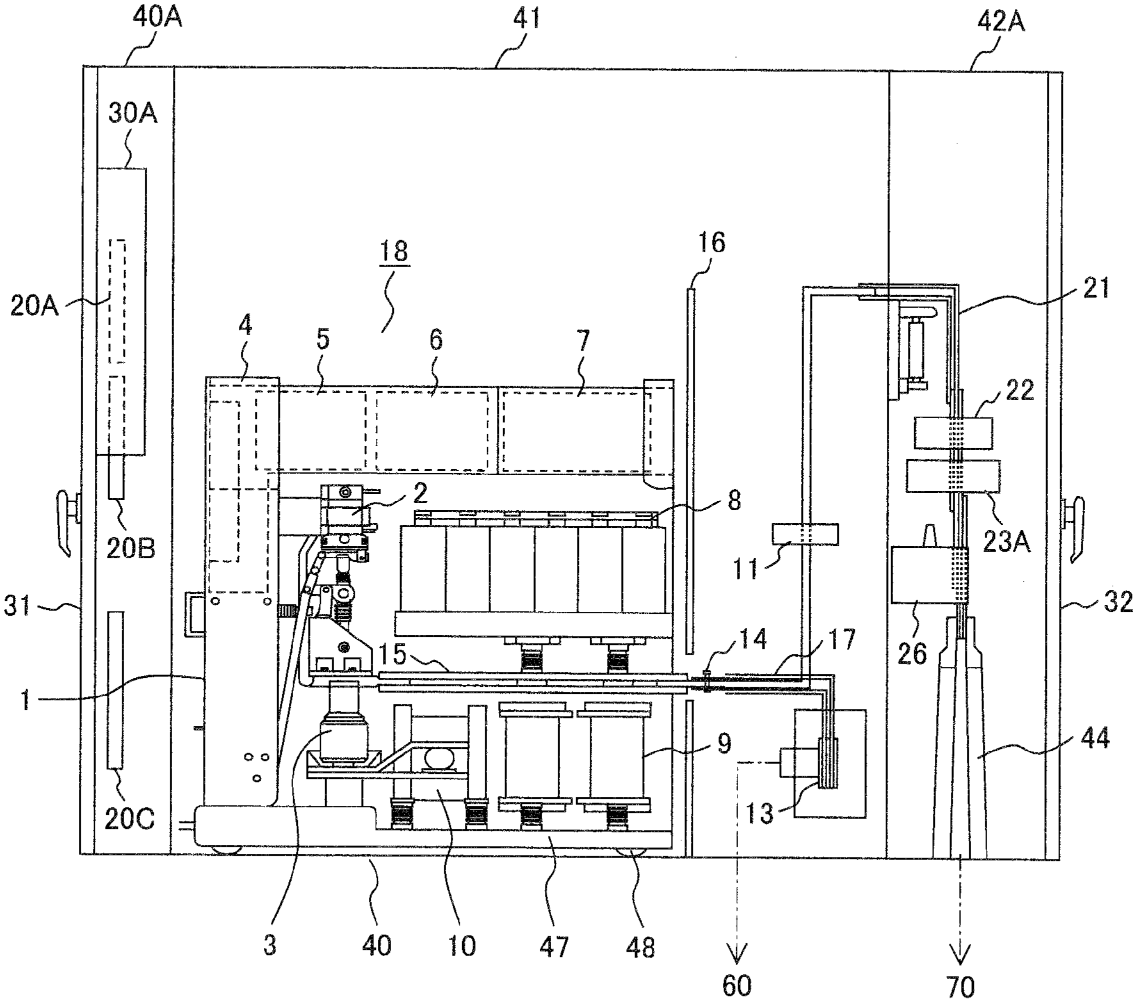
FIG. 2 is a drawing showing an embodiment of the present invention that the commutation type DC breaker is stored in the power board.
Figure 3:
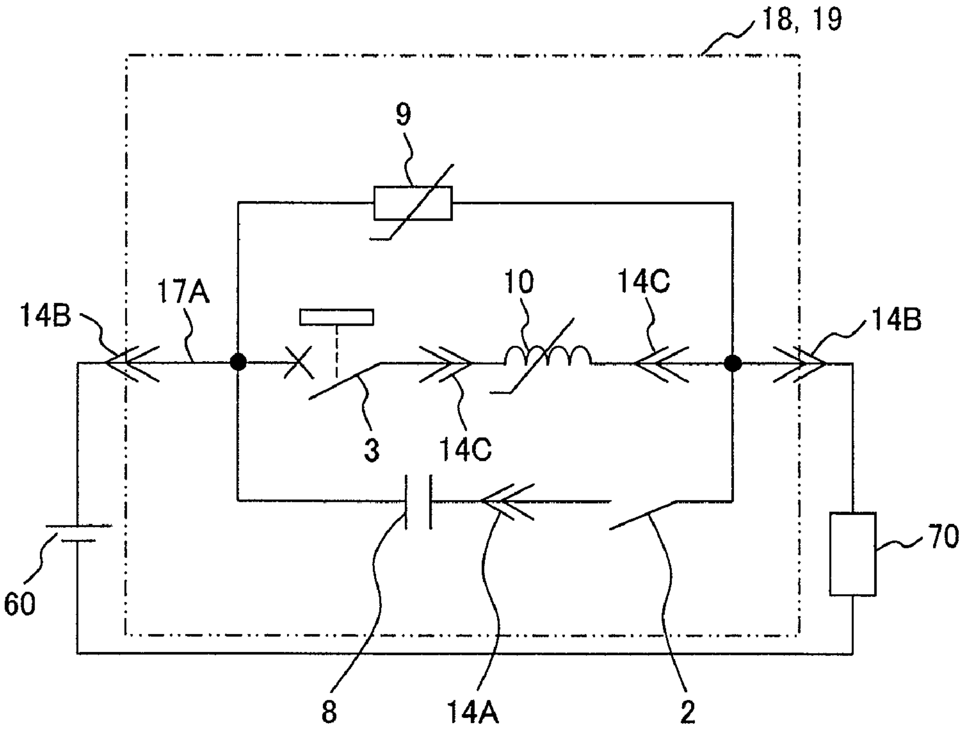
PRIOR ART FIG. 3
FIG. 3 is a drawing for explaining the principle of the commutation type DC breaker.
Figure 4:
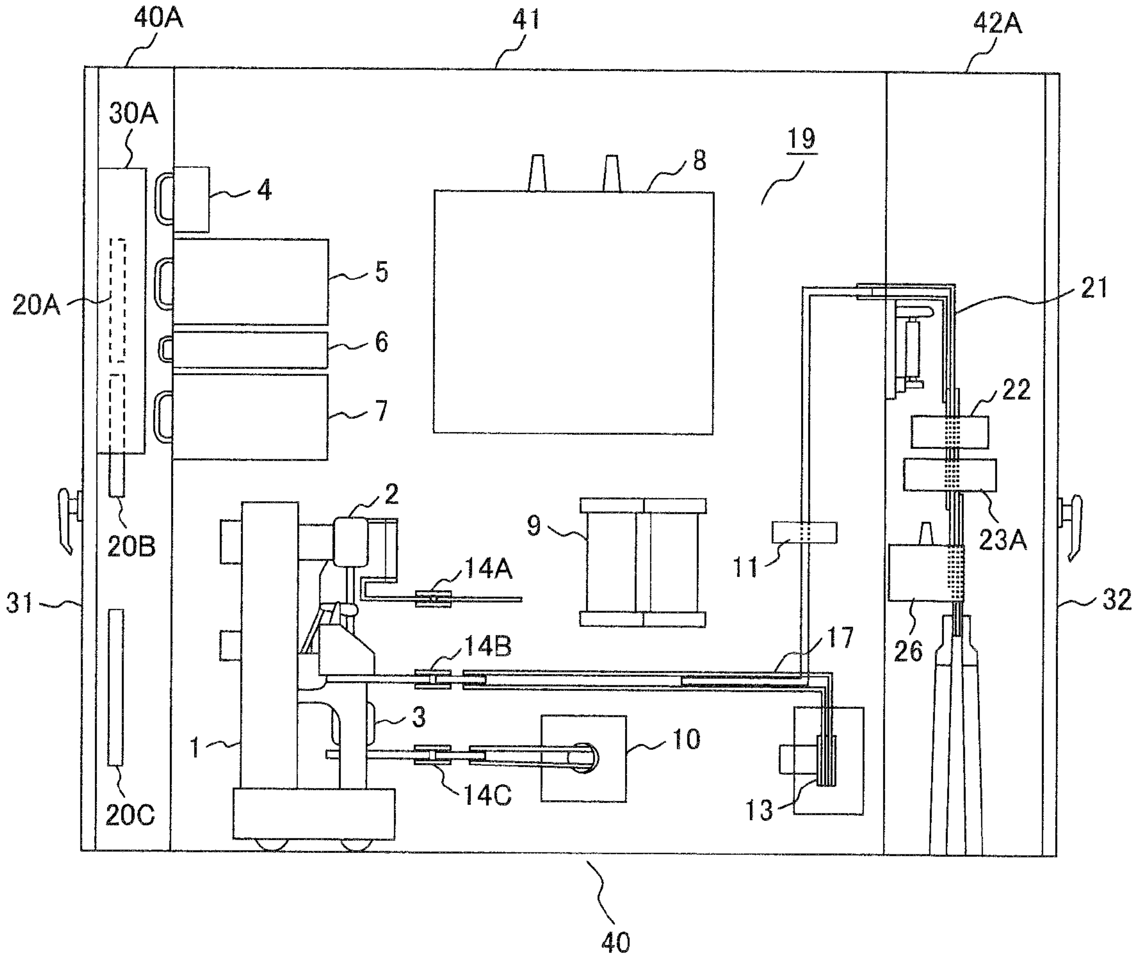
FIG. 4 (PRIOR ART)
FIG. 4 is a cross sectional view showing the conventional commutation type DC breaker arranged in the power board.

FIG. 2 is a drawing showing an embodiment of the present invention that the commutation type DC breaker 18 of the present invention is stored in the power board. In FIG. 2, the numeral 40 indicates a power board and it includes the front storage box 40A, DC breaker storage box 41, and back storage box 42A. In the front storage box 40A, the power board control unit 30, terminal boards 20, and front door 31 are arranged. In the DC breaker storage box 41, the DC breaker 18 shown in FIG. 1 is arranged. A numeral 16 indicates a partition plate, which partitions between the DC breaker 18 and the main circuit conductor 17 arranged on the back side of the breaker storage box 41. On the back of the partition plate 16, the main circuit conductor 17 is arranged. The main circuit conductor 17 is connected to the bus 13 via the main switch 3. The numeral 11 indicates the overcurrent detector mounted on the main circuit conductor. In the back storage box 42A, a cable 44 connected to an external load (a feeder) is stored. The cable is connected to the main circuit conductor 17 via the connecting conductor 21. Further, on the cable connecting conductor 21, the meter DC transformer 26, DC transformer 23A, and feeder failure selection unit 22 are mounted.

According to this embodiment, the kind, constitution, and arrangement of the units installed inside the front storage box 40A and back storage box 42A composing the power board 40 are changed, thus the specifications and use of the DC circuit power board can be changed without altering the constitution of the DC breaker storage box 41. Namely, the DC breaker storage box 41 can be standardized. Therefore, the burden imposed on the design and manufacture of the DC circuit power board can be lightened. Further, the overall height of the power board can be reduced, thus miniaturization, weight reduction, and cost savings can be realized in the DC circuit power board.

Further, in the case of maintenance checks or parts exchanges of the power board 40, the front door 31 arranged on the front of the power board 40 is opened and then the movable commutation type DC breaker 18 is pulled out from the front storage box 40A. By doing this, the DC breaker is separated from the main circuit conductor 17 in the portion of the contactor 14, and overall the commutation type DC breaker 18 can be checked safely, and parts exchanges can be executed. Further, in the power board 40 after the commutation type DC breaker 18 is pulled out, no person can approach the main circuit conductor 17 due to the partition plate 16, so that the internal checks can be executed safely.

As explained above, according to this embodiment, the commutation type DC breaker can be structured on a movable frame as a simple body. Therefore, mass production of articles of the same design can be realized. Therefore, in the power board for storing the DC breaker as a simple body, the design of the commutation type DC breaker itself is not necessary.

As mentioned above, when the commutation type DC breaker of this embodiment is adopted, when designing a DC circuit power board of a different use and specification, the DC breaker can be standardized, and the DC breaker storage box can be miniaturized and reduced in weight, and the labor and time of design and manufacturing can be reduced, thus a commutation type DC breaker facilitating maintenance checks at a low cost can be provided.

What is claimed is:

1. A commutation type DC breaker comprising a main switch inserted in series into a main circuit for connecting a DC source and a load, a main switch drive unit to drive the main switch, a commutation capacitor, a reactor, a non-linear resistor, and a commutation switch for supplying charges stored in the commutation capacitor to the main switch in an opposite direction to a main circuit current, producing a current zero point, thereby breaking the main switch, characterized in that a control circuit for controlling the main switch drive unit is disposed above the commutation capacitor, and all of the commutation capacitor, the reactor, the non-linear resistor, and the commutation switch which compose a commutation circuit and the control circuit are loaded on a frame with the main switch loaded, and the commutation capacitor is divided into a plurality of capacitors.

2. A commutation type DC breaker according to claim 1, wherein the main switch includes a contactor freely connectable to and separable from a main circuit conductor installed in a power board, and the frame is constructed movably, whereby the commutation type DC breaker loaded on the frame is made movable with the frame.

* * * * *